(12) United States Patent　　(10) Patent No.: US 7,804,483 B2
Zhou et al.　　(45) Date of Patent: Sep. 28, 2010

(54) ELECTROPHORETIC DISPLAY WITH RAPID DRAWING MODE WAVEFORM

(75) Inventors: Guofu Zhou, Best (NL); Neculai N. Ailenei, Landgraaf (NL); Johannes P. van de Kamer, Heerlen (NL); Alexander V. Henzen, Landgraaf (NL); Roger P. A. Deinoij, Sittard (NL); Mark T. Johnson, Veldhoven (NL); Rogier H. M. Cortie, Ittervoort (NL); Mischa E. T. Nelis, Simpelvelo (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 758 days.

(21) Appl. No.: 10/599,266

(22) PCT Filed: Apr. 11, 2005

(86) PCT No.: PCT/IB2005/051181

§ 371 (c)(1),
(2), (4) Date: Sep. 25, 2006

(87) PCT Pub. No.: WO2005/101362

PCT Pub. Date: Oct. 27, 2005

(65) Prior Publication Data

US 2007/0205978 A1　　Sep. 6, 2007

Related U.S. Application Data

(60) Provisional application No. 60/561,606, filed on Apr. 13, 2004.

(51) Int. Cl.
　　*G09G 3/34*　　(2006.01)
　　*G02B 26/00*　　(2006.01)
(52) U.S. Cl. ........................ 345/107; 359/296
(58) Field of Classification Search ................ 345/107; 359/296
　　See application file for complete search history.

(56) References Cited

U.S. PATENT DOCUMENTS

| 6,067,185 | A | 5/2000 | Albert et al. |
| 6,198,809 | B1 | 3/2001 | Disanto et al. |
| 2003/0137521 | A1 | 7/2003 | Zehner et al. |
| 2003/0179190 | A1 | 9/2003 | Franzen |

FOREIGN PATENT DOCUMENTS

| EP | 0186519 | 7/1986 |
| WO | WO03044765 | 5/2003 |
| WO | WO2004013746 | 2/2004 |

*Primary Examiner*—Amr Awad
*Assistant Examiner*—Jonathan Boyd

(57) ABSTRACT

An electrophoretic display (10) and a system (12) implement a method of activating a portion of the electrophoretic display (10). The method involves a reception of drawing information (14), a determination of at least one drawing-mode waveform (68) based on the drawing information (14), and an addressing of the electrophoretic display (10) based on the received drawing information (14) and the drawing-mode waveform (68).

19 Claims, 4 Drawing Sheets

ELECTROPHORETIC DISPLAY WITH RAPID DRAWING MODE WAVEFORM

CROSS REFERENCE TO RELATED APPLICATION

This application claims the benefit of U.S. provisional application Ser. No. 60/561,606 filed Apr. 13, 2004, which is incorporated herein in whole by reference.

This invention relates generally to electrophoretic displays, and more specifically to activating an electrophoretic display with a rapid drawing update mode.

Electrophoretic display media store digital information in the form of viewable text or images. Nonvolatile electrophoretic displays are generally characterized by the movement of polarized or charged particles in an applied electric field, and can be bi-stable with display elements having first and second display states that differ in at least one optical property such as lightness or darkness of a color. In recently developed electrophoretic displays, the display states occur after microencapsulated particles in the electronic ink have been driven to one state or another by an electronic pulse of a finite duration, and the driven state persists after the activation voltage has been removed. An exemplary electrophoretic display with microcapsules containing either a cellulosic or gel-like phase and a liquid phase, or containing two or more immiscible fluids are described in "Process for Creating an Encapsulated Electrophoretic Display," Albert et al., U.S. Pat. No. 6,067,185 issued May 23, 2000.

Electrophoretic displays receive image data and may be addressed by driving an active matrix located on the frontside or backside of the display. The active-matrix displays have intrinsic addressing schemes such as fixed coordinates on a pixel-by-pixel grid to accurately write text and graphics. An exemplary electrophoretic display unit comprises a layer of electrophoretic ink with a transparent common electrode on one side, and a substrate or a backplane having pixel electrodes arranged in rows and columns. The crossing between a row and a column is associated with an image pixel that is formed between a pixel electrode and a portion of the common electrode. The pixel electrode connects to the drain of a transistor, of which the source is electrically coupled to a column electrode and of which the gate is electrically connected to a row electrode. This arrangement of pixel electrodes, transistors, row electrodes and column electrodes jointly forms an active matrix. A row driver supplies a row selection signal via the row electrodes to select a row of pixels and a column driver supplies data signals to the selected row of pixels via the column electrodes and the transistors. The data signals on the column electrodes correspond to data to be displayed, and together with the row selection signal, form driving signals for driving one or more pixels in the electrophoretic display.

Electrophoretic ink, also referred to as electronic ink or e-ink, is positioned between the transparent common electrode and the pixel electrodes and typically comprises multiple microcapsules having a diameter between about 10 and 50 microns. In one example of a black-and-white display, each microcapsule comprises positively charged white particles and negatively charged black particles suspended in a fluid. When a negative electric field is applied from the pixel electrode to the transparent common electrode, the negatively charged black particles move towards the common electrode and the pixel becomes darker to a viewer. Simultaneously, the positively charged white particles move towards the pixel electrode on the backplane, away from the viewer's sight.

Applying an activation voltage between pixel electrodes and the common electrode for specified periods of time can create black or white pixels in an active-matrix monochromatic electrophoretic display. For a characteristic active-matrix electrophoretic display of current art, pulse-width modulation on a frame-by-frame basis may use, for example, a column driver with three voltage levels: −15 volts, +15 volts and 0 volts.

Electrophoretic displays have favorable attributes of good brightness and contrast, wide-viewing angles, high stability for two or more optical states, and low power consumption when compared to those of liquid crystal displays (LCDs). Additionally, the average power consumption of electrophoretic displays is much lower than that of LCDs due to the lower required refresh rate.

A lower refresh rate results from the bi-stability of the electrophoretic material, which can hold an image substantially on the display without supplying any voltage pulse. The voltage pulse is only needed during next image update. Furthermore, no updating or refreshing of a pixel and concomitant driving voltage are needed when the optical state of the pixel does not change during the next image update, resulting still lower power consumption.

Active matrix electrophoretic displays have been designed to operate in several different modes such as grayscale clear mode, four-level grayscale image update mode, and monochrome update mode. The grayscale clear mode has a regular refresh of a display, for example, after every ten minutes of reading with a relatively long update time. The four-level grayscale image update mode has, for example, an image update time of about 900 milliseconds to achieve grayscale image transitions. The faster black-and-white monochromatic update mode has a minimum of about 400 milliseconds for a black-and-white update. In the latter example, the monochrome data is loaded when only monochrome data are updated, as in the example of a black-and-white e-book application. The benefit is that the total image update time of the monochrome update is usually about the half of that used in the grayscale update.

Recent developments and commercialization of bi-stable monochromatic electrophoretic display technology point to the need for improved addressing schemes that enable faster drawing and typing modes with a smoother image update process. Current monochromatic electrophoretic display systems require about 400 milliseconds to reach fully black or white levels, and thus are too slow for active drawing or typing applications where update times need to be closer to the rate of 100 milliseconds. For example, a typing rate of ten keystrokes per second requires 100 millisecond updates for each new letter. Input devices such as a touch screen or keyboard could control active drawing or typing applications.

Drawing and typing applications need relatively short display update times, and the visibility of the drawing and typing should be nearly immediate. In order for typing or drawing on a display to be visually acceptable to the viewer, operational update rates for drawing or typing onto a monochromatic electrophoretic display need to increase to an update rate of several times higher than that of the fastest normal image update mode and to provide a smooth, improved-perceptional image update process with reduced flicker.

Therefore, what is needed is an improved addressing method and associated system for updating electrophoretic displays with lower latency for more interactive applications such as drawing or typing where relatively quick visual response and feedback are necessary. In addition, a desirable method for updating a drawing or typed text on an electrophoretic display also reduces power consumption and image-update time while offering the required uniformity, resolution and accuracy of the displayed drawing or typed text.

One form of the present invention is a method of activating a portion of an electrophoretic display. Drawing information is received, and at least one drawing-mode waveform is determined based on the drawing information. The portion of the electrophoretic display is addressed based on the drawing information and the drawing-mode waveform.

Another form of the present invention is a system for activating a portion of an electrophoretic display, including an electrophoretic pixel array disposed on a backplane, means for receiving drawing information, means for determining at least one drawing-mode waveform based on the drawing information, and means for addressing the portion of the electrophoretic display based on the drawing information and the drawing-mode waveform.

Another form of the present invention is an electrophoretic display comprising an electrophoretic pixel array disposed on a backplane, a row driver, a column driver, and a controller electrically connected to the row driver and the column driver. The row driver is electrically connected to a set of rows of the electrophoretic pixel array, and the column driver is electrically connected to a set of columns of the electrophoretic pixel array. The controller determines at least one drawing-mode waveform based on drawing information, and addresses a portion of the electrophoretic display based on the drawing information and the drawing-mode waveform to write an image onto at least one electrophoretic pixel in the electrophoretic display.

The aforementioned forms as well as other forms and features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

Various embodiments of the present invention are illustrated by the accompanying figures, wherein.

Figure 1:
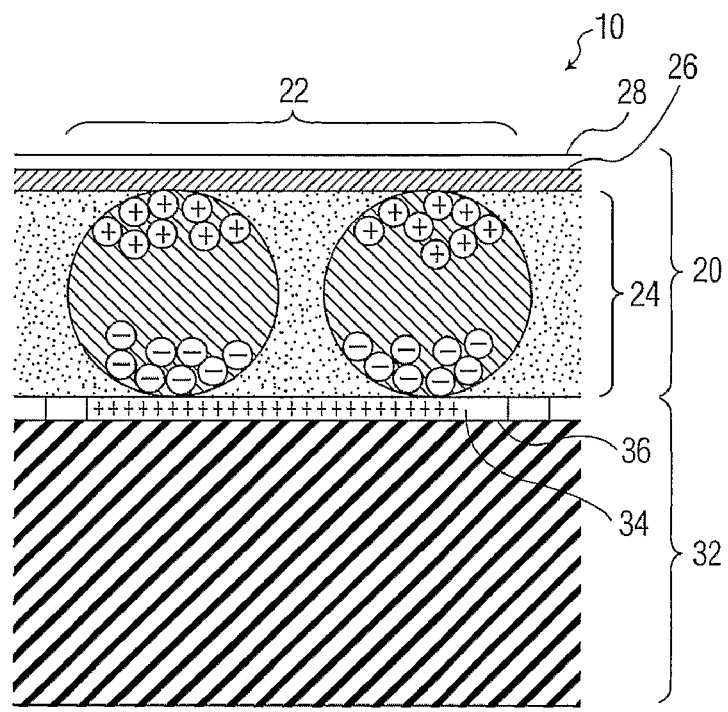
FIG. 1 shows an illustrative cross-sectional view of a portion of an electrophoretic display, in accordance with one embodiment of the present invention.

FIG. 1 shows an illustrative cross-sectional view of a portion of an electrophoretic display 10, in accordance with one embodiment of the present invention. Electrophoretic display 10, sometimes referred to as a bi-stable display in the current art, includes an addressable electrophoretic pixel array 20 with an array of electrophoretic pixels 22.

In an exemplary embodiment, electrophoretic pixel array 20 comprises a layer of electrophoretic ink 24 disposed on a backplane 32. Electrophoretic ink 24 may comprise one of several commercially available electrophoretic inks, commonly referred to as electronic ink or e-ink. Electrophoretic ink 24 comprises, for example, a thin electrophoretic film with millions of tiny microcapsules in which positively charged white particles and negatively charged black particles are suspended in a clear fluid. Other variants are possible, such as positively charged black particles and negatively charged white particles, or colored particles of one polarity and black or white particles of the opposite polarity, or colored particles in a white colored fluid, or particles in a gaseous fluid or colored particles in air.

The encapsulated electrophoretic particles can be rotated or translated by application of an electric field into a desired orientation. The electrophoretic particles reorient or migrate along field lines of the applied electric field and can be switched from one optical state to another based on the direction and intensity of the electric field and the time allowed to switch states. For example, when a positive electric field is applied to the display on a pixel electrode, the white particles move to the top of the microcapsules where they become visible to the user. This makes the surface appear white at the top position or outer surface of the microcapsules. At the same time, the electric field pulls the black particles to the bottom of the microcapsules where they are hidden. When the process is reversed, the black particles appear at the top of the microcapsules, which makes the surface appear dark at the surface of the microcapsules. When the activation voltage is removed, a fixed image remains on the display surface.

Electrophoretic ink 24 may contain an array of colored electrophoretic materials to allow the generation and display of colored images such as an array of magenta, yellow, and cyan electrophoretic materials, or an array of red, green, blue and black electrophoretic materials. Alternatively, electrophoretic display 10 may include an array of colored filters such as red, green and blue positioned above black and white electrophoretic pixels. A matrix of rows and columns allows each electrophoretic pixel 22 to be individually addressed and switched into the desired optical state such as black, white, gray, or another prescribed color. Each electrophoretic pixel 22 may include one or more microcapsules, related in part to the size of the microcapsules and the included area within each pixel element.

A transparent common electrode 26 positioned on one side of electrophoretic ink 24 comprises, for example, a transparent conductive material such as indium tin oxide that allows topside viewing of electrophoretic display 10. Common electrode 26 does not need to be patterned. Electrophoretic ink 24 and common electrode 26 may be covered with a transparent protective layer 28 such as a thin layer of polyethylene. An adhesive substance may be disposed on the other side of electrophoretic ink 24 to allow attachment to a backplane 32. The layer of electrophoretic ink 24 may be glued, adhered, or otherwise attached to backplane 32. Backplane 32 comprises a plastic, glass, ceramic or metal backing layer having an array of addressable pixel electrodes and supporting electronics. In an alternative embodiment, individual pixel electrodes and the common electrode may be arranged on the same substrate, whereby an in-plane electric field may be generated to move particles in an in-plane direction.

When the layer of electrophoretic ink 24 is attached to backplane 32, individual pixel electrodes 36 on backplane 32 allow a predetermined charge 34 to be placed onto one or more electrophoretic pixels 22. The electric field resulting from charge 34 causes transitions from one optical state to another of electrophoretic ink 24. The electric field generates a force to re-orient and/or displace charged particles in the layer of electrophoretic ink 24, providing a black and white or variable color display from which text, graphics, images, photographs, keyboard input from a keyboard or a keypad, drawing input from a touch screen or other drawing input device, pointer input from a mouse or a cursor generator, drawing information, and other image data can be presented. Gray tones or specific colors of electrophoretic ink 24 can be achieved, for example, by controlling the magnitude, level, location and timing of the activation voltage and associated charge 34.

Addressing of electrophoretic ink 24 is accomplished by applying an activation voltage to one or more pixel electrodes 36, placing a predetermined amount of charge 34 thereon, and switching electrophoretic ink 24 to the desired optical state. Application and storage of charge 34 onto a pixel electrode 36 allows continued activation of the electrophoretic ink 24 when the activation voltage is removed, even if activation occurs on a slower time scale than the scanning process. The short-term storage effect of charge 34 on the pixel electrodes 36 allows scanning and accessing other rows of pixels while the image continues to form in electrophoretic ink 24. Removal of the applied activation charge 34 quenches or immobilizes electrophoretic ink 24 at the achieved optical state.

For example, electrophoretic ink 24 may be switched from white to black. In another example, an initially black optical state is switched controllably to a gray or white state. In another example, a white optical state is switched to a gray optical state. In yet another example, colored electrophoretic ink 24 switches from one color to another based on the activation voltage and the activation charge 34 applied to pixel electrodes 36. After addressing and switching have been completed, electrophoretic displays incorporating electrophoretic ink 24 continue to be viewable with no additional power consumption.

Electrophoretic pixels 22 are addressable, for example, with a thin-film transistor array on backplane 32 and associated row and column drivers that place predetermined charge 34 onto pixel electrodes 36 of electrophoretic pixel 22 for a prescribed time to reach the desired optical state. Charge 34 is subsequently removed to retain electrophoretic pixel 22 in the acquired optical state. Intermediate values of gray can be obtained by controlling the amount of activation time and the electric field intensity across electrophoretic pixel 22. When the electric field is removed, the particles remain in the acquired optical state, and the image written to electrophoretic display 10 is retained, even with removal of electrical power.

Sections or tiles of electrophoretic display 10 of various sizes may be assembled together or placed side-by-side to form nearly any desired size of electrophoretic display 10 that can be mounted, for example, on panels or other large surfaces. Electrophoretic display 10 may be formed with a size, for example, of a few centimeters on a side to as large as one meter by one meter or larger. Electrophoretic displays 10 with associated driver electronics may be used, for example, in monitors, laptop computers, personal digital assistants (PDAs), mobile telephones, electronic books, electronic newspapers, and electronic magazines. With active-matrix addressing, all or part of the display may be addressed and activated, allowing portions of the display such as cursors and pointers to be directly addressed and updated while other portions of the display retain their previously written images to reduce power consumption and extend battery life for portable applications.

Figure 2:
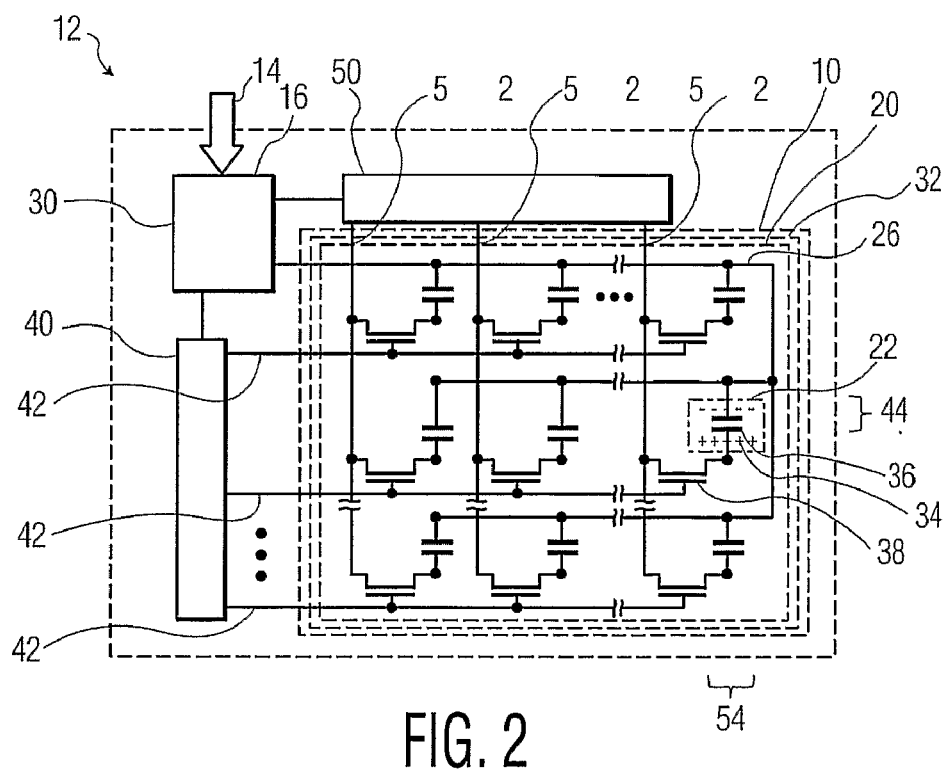
FIG. 2 shows a schematic view of a system for activating a portion of an electrophoretic display, in accordance with one embodiment of the present invention.

FIG. 2 shows a schematic view of a system 12 for activating a portion of an electrophoretic display 10, in accordance with one embodiment of the present invention. The system includes an electrophoretic display 10 having an electrophoretic pixel array 20 containing individually addressable electrophoretic pixels 22 disposed on a display panel or backplane 32, a controller 30, a row driver 40, and a column driver 50. Row driver 40 is electrically connected via a set of row electrodes 42 to a set of rows 44 of electrophoretic pixel array 20. Column driver 50 is electrically connected via a set of column electrodes 52 to a set of columns 54 of electrophoretic pixel array 20. Controller 30 is electrically connected to row driver 40 and column driver 50. Controller 30 sends command signals to row driver 40 and column driver 50 to address electrophoretic pixels 22. A memory may be coupled to or contained within controller 30 to store items such as image data; image-independent driving waveform information; image-dependent driving waveform information; data-frame times; drawing information; driving waveforms; drawing-mode waveforms; keyboard input; drawing input; pointer input; lookup tables; pixel data; and pixel information such as a pixel index, a pixel color level, a pixel coordinate, or a pixel counter. Drawing information may include keyboard input from a keyboard, a keypad or other character entry device; drawing input from a touch screen, a pen-entry system or other drawing device; pointer input from a mouse, a cursor generator or other pointer input device; image information from a memory device such as a memory stick; or image information up linked from a PC, laptop computer or PDA.

In one embodiment, drawing and typing applications need relatively short display update times, and the visibility of the drawing and typing is nearly immediate. The color or shade of gray in one or more portions of the image is changeable with each update and the response time decreases with the increase in the number of updates per second. The image update of one or more individual pixel may be able to start immediately upon receiving image information such as drawing data, regardless of the status of the image update on other pixels. For example, the image update of one pixel may start prior to the complete of an image update on another pixel. Operational update rates for drawing or typing onto a monochromatic electrophoretic display may be increased to an update rate of several times higher than that of the fastest normal image update mode in order for typing or drawing on a display to be visually acceptable to a viewer.

The timing to start updating each individual pixel can be intentionally controlled. Controlling the timing to start updating individual pixels or a set of pixels enables the realization of a smooth or improved-perceptional image update process and reduced flicker.

Electrophoretic pixels 22 in the display or in a portion thereof are activated by applying an activation potential and placing a predetermined charge 34 onto one side of electrophoretic pixel 22 when electrophoretic pixel 22 is addressed by row driver 40 and column driver 50, while common electrode 26 is biased at zero volts or at another suitable activation potential. Electrophoretic pixel 22 with common electrode 26 on one side and pixel electrode 36 on the other forms a capacitor that can be charged or discharged to the desired level. While charged, electrophoretic pixel 22 will transition from one optical state to another. Additional capacitance may be added in parallel with each electrophoretic pixel 22 to increase charge storage capability. In one example, row driver 40 and column driver 50 cooperate with controller 30 to supply activation voltages with a positive amplitude, a negative amplitude, or no amplitude to selected electrophoretic pixels 22, thereby transferring positive charge, negative charge, or no charge 34 onto the associated pixel electrodes within electrophoretic display 10.

Electrophoretic pixels 22 of electrophoretic pixel array 20 are arranged in a row-column format that allows rows 44 to be selected sequentially and in turn, while image data corresponding to each electrophoretic pixel 22 in the selected row is placed on column electrodes 52. Each electrophoretic pixel 22 in electrophoretic pixel array 20 is electrically connected on one side to common electrode 26 that is referenced, for example, to ground or 0 volts. A predetermined charge 34 may be placed on a pixel electrode 36 on the opposite side of electrophoretic pixel 22 to drive electrophoretic pixel 22 to the desired optical state. For example, a positive charge 34 placed on electrophoretic pixel 22 causes the pixel to become white, whereas a negative charge 34 placed on electrophoretic pixel 22 causes the pixel to become dark. Discharging or otherwise removing charge 34 freezes electrophoretic pixel 22 at the acquired optical state.

An array of active switching elements such as thin-film transistors 38 allows the desired charge 34 to be placed on one side of electrophoretic pixel 22. Row driver 40 is connected via row electrodes 42 to rows 44 of electrophoretic display 10. Each row electrode 42 is connected to the gates of a row of thin-film transistors 38, allowing transistors 38 in the row to be turned on when the row voltage is raised above a turn-on voltage. Row driver 40 sequentially selects row electrodes 42, while column driver 50 provides data signals to column electrodes 52. Column driver 50 is connected to column electrodes 52 of electrophoretic display 10. Each column electrode 52 is connected to the sources of a column of thin-film transistors 38. This arrangement of pixels, transistors 38, row electrodes 42, and column electrodes 52 jointly forms an active matrix. Row driver 40 supplies a selection signal for selecting a row 44 of electrophoretic pixels 22 and column driver 50 supplies data signals to selected row 44 of electrophoretic pixels 22 via column electrodes 52 and transistors 38.

Preferably, controller 30 first processes incoming image or drawing information 14, then generates the data signals, and selects the driving waveforms and drawing-mode waveforms. Mutual synchronization between row driver 40 and column driver 50 takes place via electrical connections with controller 30. Selection signals from row driver 40 select one or more rows 44 of pixel electrodes 36 via transistors 38. Transistors 38 have drain electrodes that are electrically coupled to pixel electrodes 36, gate electrodes that are electrically coupled to the row electrodes 42, and source electrodes that are electrically coupled to column electrodes 52. Data signals on column electrodes 52 are simultaneously transferred to pixel electrodes 36 coupled to the drain electrodes of turned-on transistors 38. The data signals and the row selection signals together form at least a portion of a driving waveform or a drawing-mode waveform. The data signals correspond to data to be displayed, and together with the selection signals, form a driving waveform or a drawing-mode waveform for driving one or more electrophoretic pixels 22 in the electrophoretic pixel array 20. The composite time for the driving waveform represents, for example, an image update period wherein a new image may be written or refreshed. The composite time for a drawing-mode waveform represents, for example, the period after which new drawing information such as keyboard input from a keypad may be written onto a portion of electrophoretic display 10.

The magnitude and polarity of charge 34 placed on each electrophoretic pixel 22 depends on the activation voltage applied to pixel electrodes 36. In one example, a negative voltage, zero voltage, or a positive activation voltage may be placed on each column such as −15V, 0V and 15V. As each row 44 is selected, charge 34 may be placed or removed from each pixel electrode 36 in the row based on the column voltage. For example, a negative charge, positive charge or zero charge may be placed on pixel electrode 36 of electrophoretic pixel 22 to switch the optical state accordingly. As another row 44 is addressed, charges 34 on previously addressed pixels continue to reside on pixel electrodes 36 until updated with a subsequent driving waveform or drawing-mode waveform, or are otherwise discharged.

Grayscale writing of image data to electrophoretic display 10 may be accomplished by sustaining a predetermined charge 34 on electrophoretic pixel 22 for a series of one or more data frames. Each data frame comprises pixel data and corresponding pixel address information for each row 44 in the display. The time interval to sequentially address all rows 44 in the display once with display information constitutes the data-frame time. To supply image-independent signals to electrophoretic pixels 22 during frames, controller 30 controls column driver 50 so that all electrophoretic pixels 22 in a row 44 receive the image-independent signals simultaneously. This may be done row by row, with controller 30 controlling row driver 40 in such a way that rows 44 are selected one after the other, e.g. all transistors 38 in the selected row are brought into a conducting state. To supply image-dependent signals to electrophoretic pixels 22 during a frame, controller 30 controls row driver 40 so that each row 44 is selected in turn, e.g. all transistors 38 in selected row 44 are brought into a conducting state, while controller 30 also controls column driver 50 so that electrophoretic pixels 22 in each selected row 44 receive the image-dependent signals simultaneously via associated transistors 38. Controller 30 provides row driver signals to row driver 40 to select a specific row 44 and provides column driver 50 signals to column driver 50 to place the desired voltage level and corresponding charge 34 onto each electrophoretic pixel 22 in the selected row 44. Controller 30 may provide data frames to selected portions of electrophoretic display 10 to be updated with drawing information.

Subsequent frames may contain the same display information or updated display information with additional pixel data. The grayscale level of a specific pixel may be determined by the number of consecutive frames with the same content, such as between zero and fifteen adjacent frames with a positive or negative charge 34 applied to pixel electrode 36 after electrophoretic pixel 22 has been reset to a white or black optical state. Each frame has identical data-frame times, resulting in sixteen levels of grayscale resolution per pixel.

Controller 30 processes incoming data, such as image information or drawing information 14 received via image input 16. Controller 30 detects an arrival of new drawing information 14 and in response starts processing the received drawing information 14. Processing of drawing information 14 may include loading drawing information 14, comparing the new drawing information 14 to previous image or drawing information stored in a memory coupled to controller 30, accessing memories containing lookup tables of driving waveforms, or interacting with onboard temperature sensors (not shown) to compensate for switching time variations with temperature. Controller 30 may receive drawing information 14, determine one or more drawing-mode waveforms based on drawing information 14, and address electrophoretic display 10 based on drawing information 14 and the drawing-mode waveforms to write an image onto at least one electrophoretic pixel 22 in electrophoretic display 10. Controller 30 may store pixel information based on drawing information 14, and address a portion or all of electrophoretic display 10 based on the stored pixel information. Pixel information stored in a memory within or coupled to controller 30 may be updated and used to address electrophoretic display 10. Controller 30 detects when the processing of drawing information 14 is ready and electrophoretic pixel array 20 can be addressed.

Controller 30, such as a microprocessor, a microcontroller, a field-programmable gate array (FPGA), or other digital device may receive and execute microcoded instructions to address and write a desired image onto electrophoretic display 10 or a portion thereof. Controller 30 sends row selection signals to row driver 40 and data signals to column driver 50 to activate electrophoretic display 10. Controller 30 may be contained within a personal computer (PC), a laptop computer, a personal digital assistant (PDA), an electronic book, or other digital device and connected to electrophoretic display 10. Alternatively, controller 30 is contained within electrophoretic display 10 on backplane 32.

Controller 30 generates data signals that are supplied to column driver 50, and in cooperation with row driver 40 generates row selection signals that are supplied to the set of rows 44. Data signals supplied to column driver 50 may include an image-independent portion and an image-dependent portion. Image-independent portions of the driving waveform include signals that are identically applied to some or all of electrophoretic pixels 22 in electrophoretic pixel array 20 such as reset pulses or preconditioning pulses. Image-dependent portions of the driving waveform include image or drawing information and may or may not vary between individual electrophoretic pixels 22. Drawing-mode waveforms may be shorter, and may include or exclude reset pulses or preconditioning pulses.

Portions or all of electrophoretic display 10 may be addressed using pulse-width modulation, activation-voltage modulation, or a combination thereof. Pulse-width modulation provides pulses of variable length such as increments of data-frame time to transition electrophoretic pixels 22 to the desired optical state. Modulation of the activation voltage, such as varying the amplitude of the negative or positive activation voltages applied to pixel electrodes 36, affects the driving force for the electrophoretic particles and can be used to achieve additional gray levels, accuracy of gray scale, or matching to background levels within the display.

Controller 30 may generate or select a driving waveform or a drawing-mode waveform. Electrophoretic display 10 may be addressed based on the generated or selected driving waveform or drawing-mode waveform. With reference to numbered elements described in more detail with FIG. 6, a driving waveform 60 or a drawing-mode waveform 68 may have an image-dependent portion having at least one data frame 70 based on received drawing information 14 and a current optical state of at least one electrophoretic pixel 22 in electrophoretic pixel away 20. Controller 30 selects driving waveform 60 or drawing-mode waveform 68 from, for example, a lookup table residing in a memory within or electrically connected to controller 30.

Controller 30 generates a plurality of data frames 70 from received drawing information 14 and addresses electrophoretic pixel array 20 accordingly. Drawing information 14 may be received via image input 16 of controller 30. Based on drawing information 14 and other input such as temperature input, controller 30 may adjust data-frame time 74 of data frames 70 to provide increased grayscale resolution and accuracy.

Controller 30 addresses row driver 40 and column driver 50 based on pixel data and data-frame times 74 of data frames 70 to activate one or more electrophoretic pixels 22 within electrophoretic pixel array 20. The contents of data frames 70 may be determined by controller 30 operating and executing associated code. Controller 30 provides data frames 70 including pixel data and data-frame time 74 to electrophoretic pixel array 20. Controller 30 may send serial or parallel pixel data and data-frame times 74 of data frames 70 to row driver 40 and column driver 50 to activate electrophoretic pixels 22 within electrophoretic pixel array 20.

Controller 30 may use one or more data frames 70 to reset electrophoretic display 10 to a predetermined optical state. After an image is written, controller 30 may address and update electrophoretic display 10 with additional data frames 70 in image-dependent or image-independent portions of the driving waveform. When an image has been written, controller 30 may power off or power down electrophoretic display 10 and associated circuitry, while electrophoretic display 10 retains the image written thereon.

Drawing information 14 may be provided to controller 30 from a parallel or serial connection with a digital computing device, a keyboard, a keypad, a touch screen, a mouse, a cursor generator, or other source of display information. The provided display data may include pixel data and data-frame time 74 with each data frame 70. Alternatively, controller 30 may generate pixel data and data-frame time 74 for each data frame 70 after receiving drawing information 14 in any suitable display format.

With a high clock speed, controller 30 may adjust data-frame time 74 of data frame 70 to provide increased grayscale resolution and increased accuracy. Electrophoretic display 10 is reset, for example, to a predetermined optical state such as all black, all white, or a pre-specified color or gray level by addressing and switching each electrophoretic pixel 22 in electrophoretic pixel array 20. With subsequently provided drawing information 14, electrophoretic display 10 may be updated with additional pixel data by addressing and writing onto electrophoretic pixels 22 in electrophoretic display 10. When electrophoretic display 10 is not addressed or a portion or all of system 12 is powered down or powered off, electrophoretic display 10 retains and displays the previously written image.

To account for temperature changes within the display and to mitigate variations in switching time with temperature, a temperature sensor (not shown) may be included on or near backplane 32. Temperature effects may be compensated, for example, by scaling data-frame times 74 in accordance with the current operating temperature of electrophoretic display 10.

In one exemplary embodiment, each electrophoretic pixel 22 in at least a portion of electrophoretic display 10 comprises associated memory means with each pixel that store pixel information including a driving waveform with frame data representing activation voltage levels and the number of data frames. The associated memory is updated during an image update, for example, by counting down the number of data frames to be applied with a counter, and stopping the image update when the counter reaches a value of zero. The image update on an individual pixel may be started at any time upon receiving image or drawing information 14, regardless of the status of any image updates to other pixels. For example, an image update may start on one pixel prior to the completion of an image update on another pixel. System 12 allows the flow of new incoming image or pixel data to be processed and sent to electrophoretic display 10 in parallel with image updates to another pixel.

Figure 3:
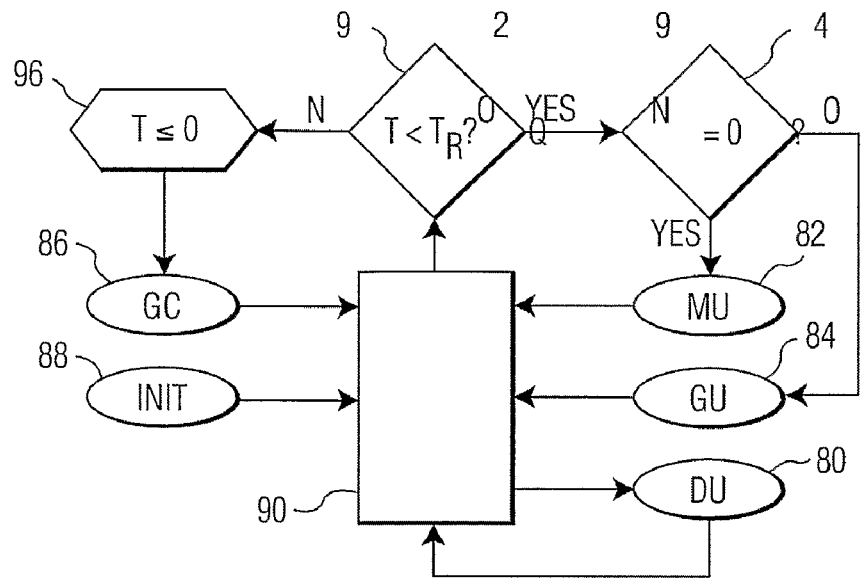
FIG. 3 illustrates a flowchart of display update modes for an electrophoretic display, in accordance with one embodiment of the present invention.

FIG. 3 illustrates a flowchart of display update modes for an electrophoretic display, in accordance with one embodiment of the present invention. In one presently preferred embodiment, a drawing-update mode operates with four other display modes. A drawing-update mode 80 may be entered when drawing information such as from a touch screen, keyboard, or drawing device is received. At least one drawing-mode waveform is generated or selected based on the drawing information, and one or more electrophoretic pixels in the electrophoretic display are addressed and activated based on the drawing information and the drawing-mode waveform.

A fast monochrome update mode 82 allows fast monochrome updates of the electrophoretic display with essentially two optical states such as black and white. Monochrome update mode 82 is suitable for displaying, for example, typed characters and line art. Because the transition time for electrophoretic ink is relatively long, the image update period for monochrome update mode 82 can be on the order of 400 milliseconds.

A grayscale update mode 84 requires more time to accurately write the desired gray levels into the display. For example, with four levels of gray: white, light gray, dark gray and black, the image update period for grayscale update mode 84 can be on the order of 900 milliseconds.

A grayscale clear mode 86 is used for refreshing the screen on a regular basis to mitigate the effects of slowly decaying pixel brightness. The image update period for grayscale clear mode 86 can be on the order of 900 milliseconds and is invoked, for example, once every ten minutes or so to sustain image quality for the viewer.

When the electrophoretic ink is refreshed or updated, the brightness is at its highest level. When power is removed, the image continues to be displayed, although the intensity or brightness of the display may decay over time. As time passes, the brightness decreases until the display is refreshed or updated. A high frequency of refreshing or updating of the electrophoretic display results in consistently high brightness and consistent gray levels. However, for low power applications such as portable displays, infrequent display updates can appreciably reduce power consumption requirements, a desirable attribute for extending battery life.

An initialization mode 88 is needed when one starts using the display or when the display is re-initialized to produce, for example, an all-white display or an all-black display.

A sleep mode 90 may be entered when other display modes have been completed to minimize power consumption and battery drain. When time T is less than a refresh time $T_r$, as seen at decision block 92, monochrome update mode 82 is entered when a update mode flag Q has been set to zero or grayscale update mode 84 is entered when update mode flag Q is not equal to zero, as seen at decision block 94. When time T exceeds the refresh time $T_r$, grayscale clear mode 86 is entered when time T in a down counter is less than or equal to zero, as seen at block 96.

In drawing-update mode 80, the latency time for updating one or more pixels is shorter than the other modes so that a user or viewer can enter characters, drawing strokes, touch a screen, move a pointer or provide drawing information and the display is rapidly updated, providing rapid feedback to the user or viewer while changing optical states within affected pixels. Drawing-update mode 80 allows the flow of new incoming drawing or typing data to be processed and to be sent to the display.

Figure 4:
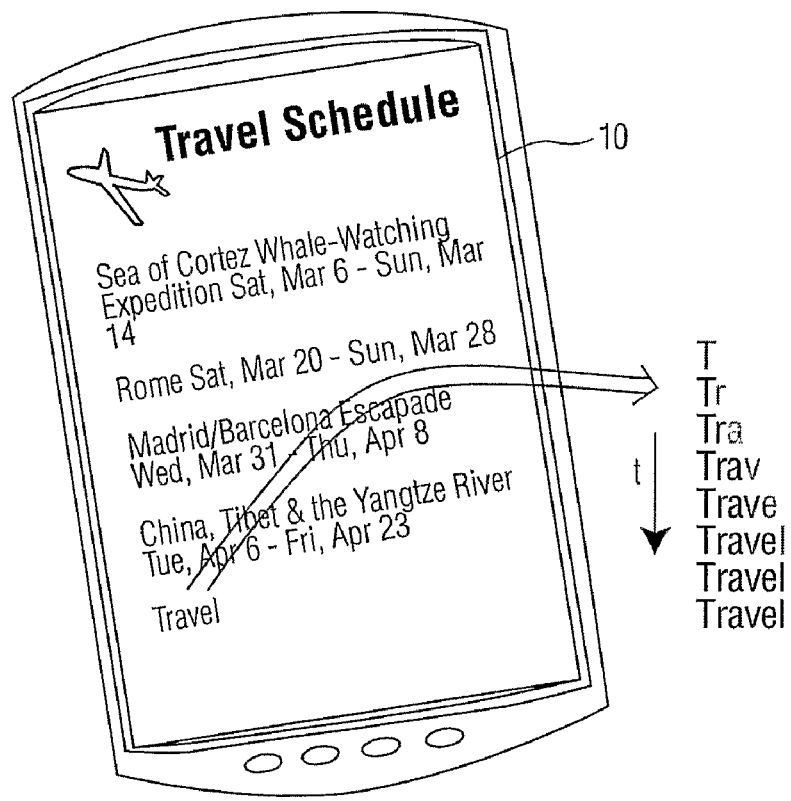
FIG. 4 illustrates an electrophoretic display operating in a drawing-update mode while receiving keyboard input, in accordance with one embodiment of the present invention.

FIG. 4 illustrates an electrophoretic display 10 operating in a drawing-update mode while receiving keyboard input, in accordance with one embodiment of the present invention. Electrophoretic display 10 might be used, for example, with a personal digital assistant (PDA), a mobile telephone, an electronic book, an electronic dictionary, or an electronic diary.

In one presently preferred embodiment, the system architecture supports four levels of grayscale: white (W), light gray (LG), dark gray (DG) and black (B). During each display update, the controller compares the grayscale of the pixel data with the current grayscale of the pixel as displayed during the last display update. During such a display update, the controller does not accept new information, so if after each keystroke the display must be updated to display the character, the typing speed to show freshly typed characters is limited by the image update period.

During a display update with four levels, each pixel has up to sixteen possible transitions: W to W; W to LG; W to DG; W to B; LG to W; and so forth. For each of these transitions, the controller holds a waveform that drives the pixel to a new gray level. Normally, each driving waveform has a full-length image update period defining the full transition from any gray level to another, as indicated for a monochromatic update mode can be on the order of 400 milliseconds, allowing the display to show emerging characters approximately 2½ times per second. A grayscale update mode with an image update period of 900 milliseconds increases the latency period for viewing a character even longer.

For typing, normally black characters are used on a white background. In this case, the controller can make use of the LG and DG states as intermediate levels in the transition from W to B or B to W. The driving waveform comprises, for example, three segments approximately equal in time and storable as three separate drawing-mode waveforms for the W to LG, LG to DG and DG to B transitions. When displaying a character, the controller executes three shorter display update cycles in order to display a black character on a white background. Between each image update, new information may be added such as a new character that was just typed. In the drawing-update mode, the screen response to typed input improves to a maximum of 133 milliseconds, allowing the display to show emerging characters approximately 7½ times per second. Foreshortening of the drawing-mode waveform to a few frames reduces the latency period accordingly.

In an example where the user types "Travel" onto an all-white display background, pixels comprising the letter "T" transitions from W to LG during the first display update. In the second display update, the letter "T" transitions from LG to DG and the letter "R" transitions from W to LG. In the third transition, the letter "T" transitions from DG to B, the letter "R" transitions from LG to DG, and the letter "A" transitions from W to LG. In the fourth transition, the letter "R" transitions from DG to B, the letter "A" transitions from LG to DG, and the letter "V" transitions from W to LG. In the fifth transition, the letter "A" transitions from DG to B, the letter "V" transitions from LG to DG, and the letter "E" transitions from W to LG. In the sixth transition, the letter "V" transitions from DG to B, the letter "E" transitions from LG to DG, and the letter "L" transitions from W to LG. In the seventh transition, the letter "E" transitions from DG to B, and the letter "L" transitions from LG to DG. In the eighth transition, the letter "L" transitions from DG to B, and so forth.

In another example, pointer input from a mouse or a cursor generator such as a selection arrow, a mouse icon or a cursor bar may be re-positioned by a user, requiring minimal latency prior to viewing changes on electrophoretic display 10 as new pointer input is received. As the pointer object is moved, electrophoretic display 10 is locally updated. Each pixel may be independently updated. Driving waveforms for each pixel may be individually executed. Updates for individual pixels are stopped, for example, when a counter containing the number of frames to be applied to the pixel reaches zero or another predetermined value.

Figure 5:
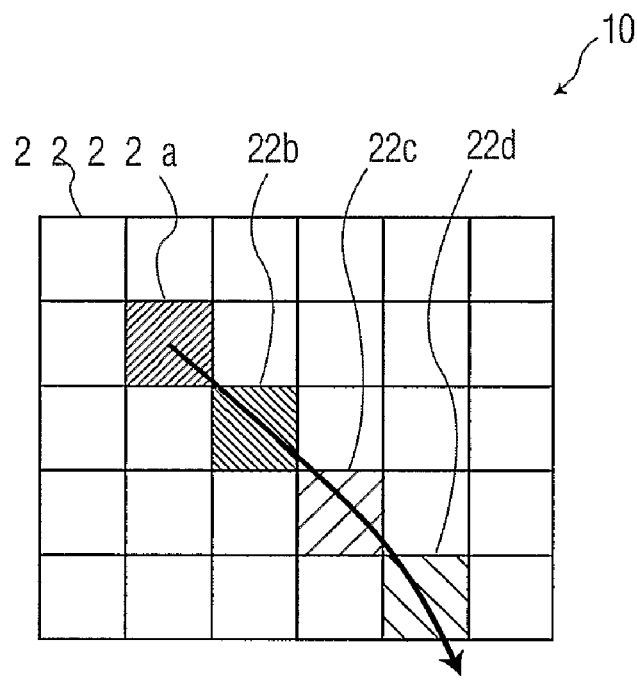
FIG. 5 illustrates a portion of an electrophoretic display operating in a drawing-update mode while receiving drawing input, in accordance with one embodiment of the present invention.

FIG. 5 illustrates a portion of an electrophoretic display operating in a drawing-update mode while receiving drawing input, in accordance with one embodiment of the present invention. A portion of an electrophoretic display 10, as represented by an array of electrophoretic pixels 22, is updated as it receives drawing input from a drawing pen or other drawing device that is stroked across that portion of the surface. Electrophoretic pixels 22a, 22b, 22c, and 22d are successively activated. With an initially white background, electrophoretic pixel 22a has switched from a white state through successive gray levels to a black state. Electrophoretic pixel 22b has switched from a white state though a dark gray level and towards a black state. Electrophoretic pixel 22c has switched from a white state through a light gray level and towards a black state. Electrophoretic pixel 22d is just beginning to switch from a white state towards a black state.

In another embodiment, drawing input from a touch screen is received, processed, and displayed accordingly. For example, as a user touches a soft button on a touch screen, the soft button on the display is highlighted or unhighlighted. Each pixel may be independently activated and driving waveforms for each pixel may be individually applied. Image updates for a pixel is stopped, for example, when a counter for the number of frames to be applied reaches zero or a prescribed maximum value. A full-length driving waveform may be used without splitting the driving waveform into subsets of shorter-length drawing-mode waveforms.

Figure 6:
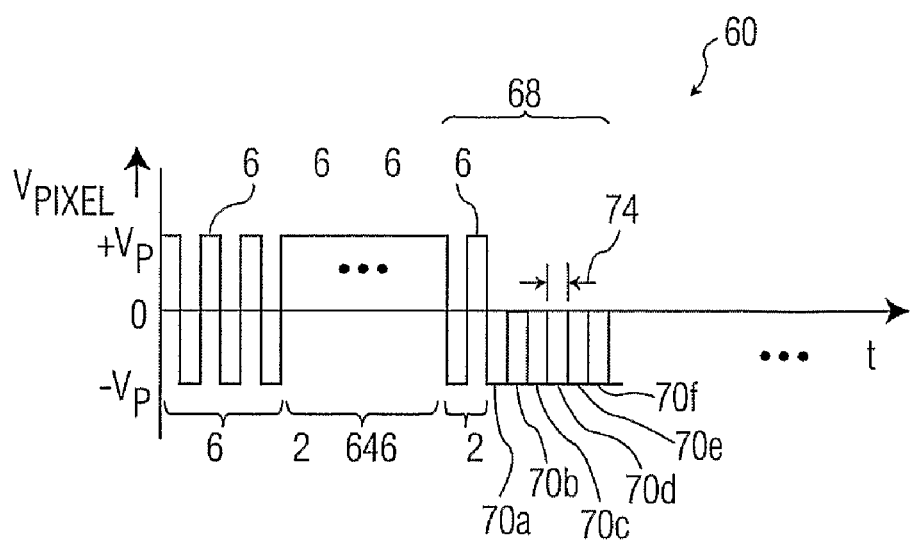
FIG. 6 illustrates a driving waveform and a drawing-mode waveform for activating a portion of an electrophoretic display, in accordance with one embodiment of the present invention.

FIG. 6 illustrates an example of a driving waveform 60 and a drawing-mode waveform 68 for activating a portion of an electrophoretic display while receiving drawing input, in accordance with one embodiment of the present invention. With reference to numbered elements in FIGS. 1 and 2, driving waveform 60 represents voltages across electrophoretic pixel 22 in electrophoretic display 10 as a function of time t. Driving waveform 60 is applied to electrophoretic pixels 22 using row selection signals from row driver 40 and data signals supplied via column driver 50. Driving waveform 60 comprises, for example, a column driving signal and a row selection signal for providing preconditioning or shaking pulses, one or more reset signals, and data signals associated with each optical state and transitions thereto. Data frames 70 are applied in an image-dependent portion of driving waveform 60 represented by data frames 70a, 70b, 70c, 70d, 70e and 70f. Data frames 70 may also be introduced into image-independent portions of driving waveform 60, such as a preconditioning portion 62 and a reset portion 64.

Driving waveform 60 comprises multiple data frames 70, including an image-dependent portion with a plurality of data frames 70. Driving waveform 60 may also include an image-independent portion comprising, for example, one or more preconditioning portions 62, reset portion 64, or a combination thereof. The represented time for and time relationships among image-dependent data frames 70, preconditioning portion 62, and reset portion 64 are intended to be illustrative and are not necessarily drawn to scale. Data-frame time 74 is the time interval required to address once pixels of all rows 44 by driving each row one after the other and by driving all columns 54 simultaneously once per row. During each data frame 70, image-dependent or image-independent data is supplied to one or more electrophoretic pixels 22 in the array. Driving waveform 60 comprises, for example, a series of shaking pulses in preconditioning portion 62 followed by a series of reset pulses in reset portion 64, another set of shaking pulses in another preconditioning portion 62, and a combination of driving pulses to drive electrophoretic pixel 22 into the desired optical state.

For example, an electrophoretic display 10 with four gray levels may have sixteen different driving waveforms 60 stored in a lookup table in a memory that is electrically connected to or part of controller 30. From an initial black state, four different driving waveforms 60 allow the initially black pixel to be optically switched to black, dark gray, light gray, or white. From an initially dark-gray state, four different driving waveforms 60 allow the initially dark-gray pixel to be optically switched to black, dark gray, light gray, or white. Additional driving waveforms 60 allow a light gray or a white pixel to be switched to any of the four gray levels. In response to drawing information 14 received via image input 16, controller 30 may select the corresponding driving waveform 60 from a lookup table for one or more electrophoretic pixels 22, and supply the corresponding row selection signals and column data signals via row driver 40 and column drivers 50 to corresponding transistors 38 connected to corresponding pixel electrodes 36.

To reduce the dependency of the optical response of electrophoretic display 10 on the image history of the pixels, preconditioning signals may be applied to electrophoretic pixels 22 prior to the application of reset signals or image-dependent signals. Preconditioning allows electrophoretic pixels 22 to switch faster with higher uniformity of transitions between one optical state and another. During preconditioning portions 62 of driving waveform 60, alternating pulses of positive and negative voltage, sometimes referred to as shaking pulses 66, are applied to one or more electrophoretic pixels 22 of the display in preparation for subsequent optical state transitions. For example, a set of alternating positive and negative voltages is applied sequentially to the pixels. These preconditioning signals may comprise applying alternating voltage levels to electrophoretic pixels that are sufficient to release the electrophoretic particles from a static state at one or both electrodes, yet either sum to zero or are too short to significantly alter the current positions of the electrophoretic particles or the optical state of the pixel. Because of the reduced dependency on the image history, the optical response of pixels to new image data are substantially independent of whether the pixel was previously black, white or gray. The application of the preconditioning signals reduces the dependency and allows a shorter switching time.

For example, during the initial portion of driving waveform 60, a first set of frames comprising the pulses of the preconditioning signals are supplied to the pixels, each pulse having a duration of one frame period. First shaking pulse 66 has a positive amplitude, second shaking pulse 66 has a negative amplitude, and third shaking pulse 66 has a positive amplitude, with additional pulses in an alternating sequence until preconditioning portion 62 is completed. As long as the duration of these pulses is relatively short or the pulses are applied in rapidly changing positive and negative levels, the pulses do not change the gray value displayed by the pixel. A shaking pulse is generally defined as a voltage pulse representing energy sufficient to release the electrophoretic particles from the current state at one or both electrodes though insufficient to bring the particles from one of the extreme positions near the electrodes to the other extreme position near the other electrode.

During reset portion 64 of driving waveform 60, electrophoretic display 10 is reset to a predetermined optical state, such as an all-black state, an all-white state, a gray-scale state, or a combination thereof. The reset pulses within reset portion 64 precede the image-dependent pulses to improve the optical response of electrophoretic display 10 by defining a fixed starting point such as black, white, or an intermediate gray level for the image-dependent pulses. For example, the starting point is selected based on previous image information or the closest gray level to new image data. A set of frames comprising one or more frame periods is supplied including pixel data associated with the desired optical state. The activation voltage and activation charge 34 may be applied for a time longer than is required to fully switch the addressed portions of electrophoretic display 10 to the initialized optical state, and then may be removed. Alternatively, electrophoretic display 10 may be reset with a positive or a negative voltage applied to common electrode 26 while pixel electrodes 36 are maintained at a low voltage or ground potential. To set electrophoretic pixels 22 at the desired optical state, adapted data frames 70 may be used.

After reset portion 64 of driving waveform 60 has been applied, electrophoretic pixels 22 appear in the predetermined optical state to the viewer. An additional preconditioning portion 62 may be applied to one or more electrophoretic pixels 22 after application of reset portion 64 in preparation for writing or updating an image to the display. Prior to addressing the display with image-dependent data, an additional preconditioning portion 62 may be added after reset portion 64 to prepare the pixels for receiving image-dependent frame data.

During the image-dependent portion of driving waveform 60, a set of data frames 70 comprising one or more frame times or periods is generated and supplied. The image-dependent signals have duration, for example, of zero, one, two, through fifteen frame periods or more with non-zero data signals corresponding to, for example, sixteen or more grayscale levels. When starting with a pixel in a black optical state, an image-dependent signal having null pixel data corresponds with the pixel continuing to display black. In the case of a pixel displaying a specific gray level, the gray level remains unchanged when being driven with a pulse having zero amplitude or with a sequence of pulses having zero amplitude. An image-dependent signal having a duration of fifteen frame periods comprises fifteen subsequent pulses and corresponds to, for example, the pixel transitioning to and displaying white. An image-dependent signal having a duration of one to fourteen frame periods comprises one to fourteen subsequent pulses and corresponds to, for example, the pixel displaying one of a limited number of gray values between black and white.

Electrophoretic display 10 is updated with image or drawing information converted and applied as pixel data to each pixel in the display on a row-by-row basis with one or more data frames 70, represented as data frames 70*a,* 70*b,* 70*c,* 70*d,* 70*e* and 70*f,* each having pixel data. In the example shown, data-frame times of data frames 70*a* through 70*f* are constant. Data-frame times 74 associated with data frames 70 may be adjusted to provide increased grayscale resolution and accuracy. Controller 30 may adjust data-frame time 74 of any frame in driving waveform 60 to improve the grayscale resolution or to reach a specific gray level, such as by delaying the start of a frame period and thereby extending the preceding frame time, by adjusting the number of clock cycles between the start of a row selection signal and the start of the next row selection signal, or by adjusting the overall system clock speed as applied to row driver 40.

Electrophoretic display 10 may be updated with additional pixel data supplied with subsequently applied driving waveforms 60. For example, to update electrophoretic pixels 22 in electrophoretic display 10, a row selection signal is applied sequentially to each row 44 of the display, while pixel data for electrophoretic pixels 22 in each row is applied to columns 54 connected to pixel electrodes 36. Positive charge, negative charge, or no charge is transferred onto pixel electrodes 36 in accordance with the frame data, and electrophoretic pixels 22 respond accordingly with a darker state, a lighter state, or no change.

Driving waveforms 60 may be used in image modes described earlier such as monochrome update mode, a grayscale update mode, a grayscale clear mode, an initialization mode, or a drawing-update mode. Alternatively, a shortened version of driving waveform 60 may be used for the drawing-update mode to reduce latency time and to display keyboard, drawing or pointer input more rapidly. Drawing-mode waveforms 68 include at least one data frame 70, and may include a preconditioning portion 62 with one or more shaking pulses 66, and may include a reset portion 64. Driving waveforms 60 and one or more drawing-mode waveforms 68 may be stored in memory and accessed, for example, with a lookup table.

To activate electrophoretic display 10, controller 30 may execute a computer program to convert image information and drawing information into a series of driving waveforms 60 and drawing-mode waveforms 68, and to address the display accordingly. The computer program includes computer program code to receive drawing information 14, to determine at least one drawing-mode waveform 68 based on drawing information 14, and to address a portion of electrophoretic display 10 based on drawing information 14 and drawing-mode waveform 68. The computer program may include code for storing pixel information such as a pixel index, a pixel color level, a pixel coordinate, or a pixel counter based on received drawing information 14, and for addressing the portion of electrophoretic display 10 based on the stored pixel information. The computer program may include code for updating the stored pixel information when the portion of the electrophoretic display is addressed.

Figure 7:
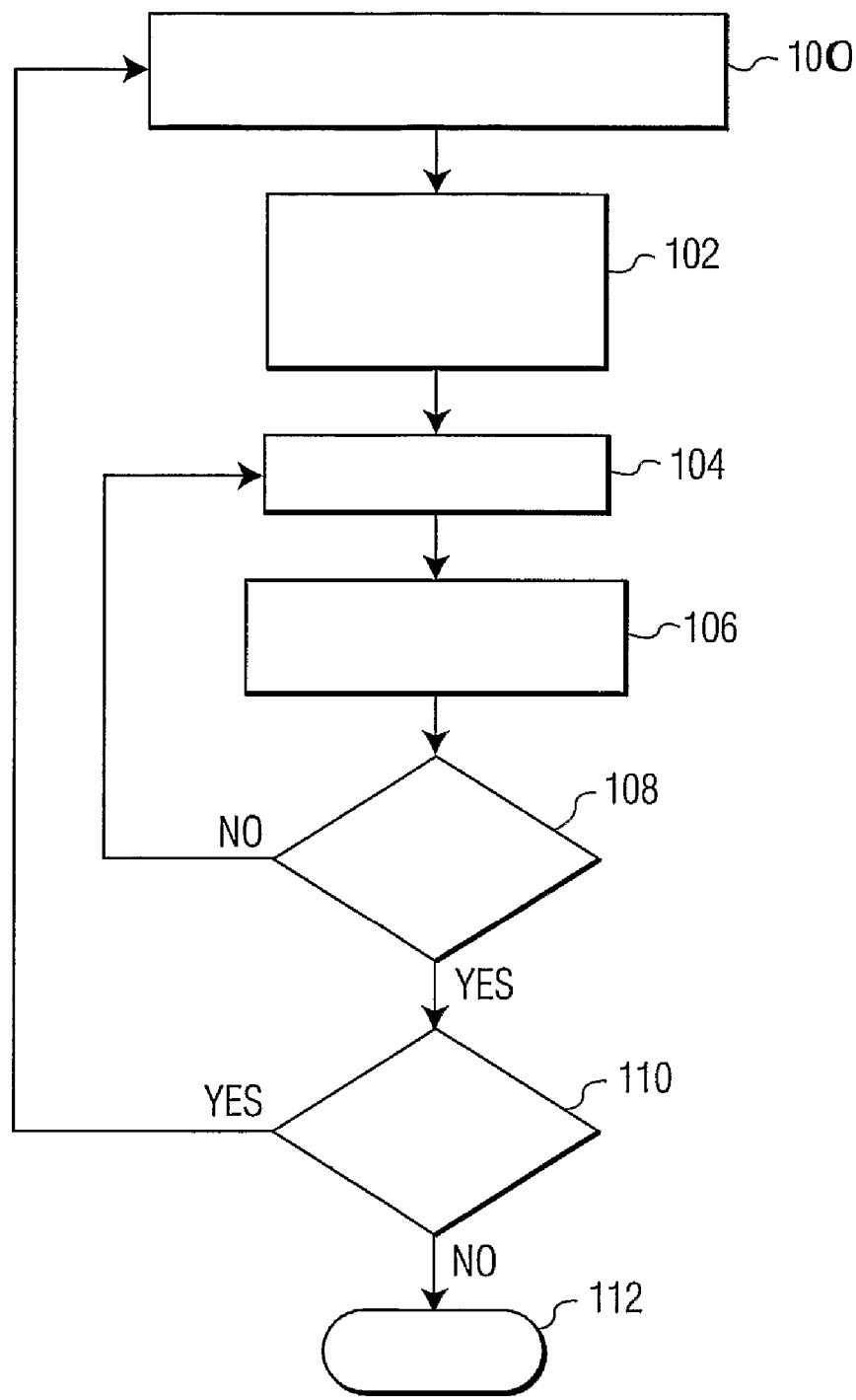
FIG. 7 shows a flow diagram for a method of activating a portion of an electrophoretic display in a drawing-update mode, in accordance with one embodiment of the present invention.

FIG. 7 shows a flow diagram for a method of activating a portion of an electrophoretic display in a drawing-update mode, in accordance with one embodiment of the present invention. The activation method includes exemplary steps to activate one or more electrophoretic pixels in an electrophoretic display.

Drawing information is received and a drawing mode update mode is entered, as seen at block 100. Drawing information may comprise keyboard input received from a keyboard, a keypad, or other character entry device. Alternatively, drawing information may comprise drawing input from a touch screen, a pen-entry system, or other drawing device. The touch screen may use any touch-screen technique known in the art. Alternatively, drawing information may comprise pointer input received, from a mouse, a cursor generator, or other pointer input device. Alternatively, drawing information may be received from a memory device such as a memory stick, or an uplink from a PC, laptop computer or PDA that is optionally connected to a controller electrically coupled to the electrophoretic display. Drawing information may be received via a wired or wireless link from any suitable source such as an image server or a stored file. The controller may be connected to a communications network such as a local area network (LAN), a wide-area network (WAN), or the Internet to receive and send information and to transfer images onto the electrophoretic display. The drawing information may be provided in real time as the image is written to the electrophoretic display, or stored within memory until written. When drawing information is received, the image data may be processed to generate or select one or more drawing-mode waveforms to address and activate a portion of the electrophoretic display.

One or more drawing-mode waveforms are determined, as seen at block 102. The drawing-mode waveform is based on the drawing information. The drawing-mode waveforms may be selected from a set of stored driving waveforms based on the drawing information and the current optical state of at least one electrophoretic pixel in the portion of the electrophoretic display. Alternatively, the drawing-mode waveform is selected from a lookup table stored in memory. Alternatively, the drawing-mode waveform is generated or adapted from one or more driving waveforms.

The selected drawing-mode waveform may include a portion having at least one data frame based on the received drawing information and a current optical state of at least one electrophoretic pixel in the display. The selected drawing-mode waveform may include one or more shaking pulses. The selected drawing-mode waveform may include one or more reset pulses.

In another embodiment, the selected drawing-mode waveform is adjusted based on a scaling factor from, for example, a scaling factor table. The data-frame time of one or more data frames may be adjusted to provide increased grayscale resolution and increased accuracy. Alternatively, the activation-voltage amplitude of one or more data frames may be adjusted to provide the desired levels.

In another embodiment, the number of data frames in the selected drawing-mode waveform is adjusted as a form of pulse-width modulation, and the electrophoretic display is addressed with the adjusted drawing-mode waveform to activate one or more electrophoretic pixels. In another embodiment, the activation-voltage amplitude of the selected drawing-mode waveform is adjusted as a form of activation-voltage modulation, and the electrophoretic display is addressed with the adjusted drawing-mode waveform.

A portion of the electrophoretic display is addressed, as seen at block 104. The portion of the electrophoretic display is addressed based on the received drawing information and the drawing-mode waveform. Addressing a portion of the electrophoretic display comprises, for example, writing pixel data onto at least one electrophoretic pixel in the portion.

In one embodiment, the portion of the electrophoretic display is addressed by applying the determined drawing-mode waveform a predetermined number of times to write an image onto at least one electrophoretic pixel in the electrophoretic display. A pixel counter such as a down counter or an up counter may be used to track the number of frames or drawing-mode waveforms applied to the pixels. Counters may be associated with one or more pixels, for example, to allow one set of pixels to be addressed while a second set of pixels continues to be updated. In another embodiment, the portion of the electrophoretic display is addressed using pulse-width modulation, activation-voltage modulation or a combination thereof.

Data frames within the drawing-mode waveform may include null pixel data when no change to the optical state of the associated pixels is desired. Alternatively, pixel data corresponding to positive or negative activation voltages and positive or negative charge on the pixel electrodes may be used to activate the electrophoretic pixels.

When the electrophoretic display is addressed and an image is transferred to the electrophoretic display, an activation voltage is applied to one or more electrophoretic pixels and a predetermined charge is placed on corresponding pixel electrodes based on the pixel data and the data-frame times. The activation voltage is selected to switch selected portions of the electrophoretic display from the reset state or a previous optical state to the desired optical state. As charge is placed on pixel electrodes, the electrophoretic ink is activated and switches to the desired optical state. When the predetermined charge is placed across the pixels of the electrophoretic display, the electrophoretic ink continues to transition to an intended display state as long as the activation voltage is applied or the applied charge is retained on a pixel electrode. Based on the number, length and content of data frames, the electrophoretic ink is provided sufficient time to switch optical states in the designated pixels. The desired optical state for the electrophoretic display can be locked in or frozen by removal of the activation charge and the activation voltage from pixels in the display.

A portion of the electrophoretic display may be preconditioned and/or reset to a predetermined optical state. Before the electrophoretic display is addressed, electrophoretic ink of the display material may be reset to a well-defined state. The electrophoretic ink can be forced into an initialized or reset optical state through an applied electric field with, for example, the sustained application of relatively high activation voltage applied to electrophoretic pixels via the pixel electrodes. When the electrophoretic display is reset, one or more pixels in the electrophoretic display are reset to the predetermined optical state, such as an all-white, all-black, gray, or colored optical state, depending on the type of electrophoretic ink and the applied activation voltage. From this reset optical state, the electrophoretic ink can be adjusted in one common direction or another based on the driving forces applied to the electrophoretic pixels. Alternatively, a portion of the electrophoretic display may be reset with a pattern similar to the image to be written, so that only a fraction of the total switching time for the electrophoretic ink is needed to write the image with the desired grayscale resolution and accuracy. The electrophoretic display may be reset with a plurality of data frames including pixel data and data-frame times.

Prior to, in conjunction with or as an alternative to resetting the display, a portion of the electrophoretic display may be preconditioned with the application of one or more shaking or preconditioning pulses. Shaking pulses are applied to the electrophoretic pixels in the display to precondition the electrophoretic pixels for receiving pixel data or for switching to a reset state. The electrophoretic ink is preconditioned, for example, with the application of an alternating activation voltage applied to pixel electrodes in the display. After resetting the electrophoretic display and prior to writing an image, the electrophoretic display may be preconditioned once again with the application of additional shaking pulses.

Pixel data may be updated dynamically and stored when a portion of the electrophoretic display is addressed, as seen at block 106. The pixel information is stored based on the received drawing information to minimize memory storage requirements and allow addressing of selected pixels in the display. The portion of the electrophoretic display may be addressed based on the stored pixel information, such as with a down-counter assigned to one or more electrophoretic pixels being updated. The stored pixel information may include a pixel index, a pixel color level, a pixel coordinate, a pixel counter, or a combination thereof. The stored pixel information such as the pixel counter may be updated when the portion of the electrophoretic display is addressed.

As the electrophoretic pixels continue to be updated, pixels in the portion of the electrophoretic display may be addressed based on the stored pixel information, as seen at block 108. For example, the pixel counter is decremented and the portion of the electrophoretic display is addressed. When the pixel counter has reached zero or another prescribed number and the display pixels are updated, the drawing mode has been completed.

The drawing mode may be re-entered as new drawing information is received, as seen at block 110. The electrophoretic display may be updated with additional drawing information. New drawing information may be received, and the electrophoretic display updated accordingly by repeating the above steps of blocks 100 through 108.

For example, a driving or drawing-mode waveform has an update time of 600 milliseconds at 15V for an image transition from a white background to a black optical state. In this example, a fixed frame time of twenty milliseconds is used for the active matrix display, requiring thirty frames to complete the image update. In one approach, the driving waveform is split into threes subsets. Each subset has ten frames and each subset is repeated three times to complete an image update. A viewer will first see a light gray appearance, then a dark gray appearance, and then a black appearance. This method can be implemented using a relatively inexpensive controller.

In another example, a drawing-mode waveform comprising an entire, unsplit driving waveform is applied to the electrophoretic display and the number of remaining update frames to be applied is counted during the update. A pixel counter such as a frame counter associated with a first set of pixels initially reads thirty. The user immediately sees the drawing as a very light gray that gradually changes towards the desired black state. At the time when ten frames have been updated, the frame counter reads twenty. A second set of pixels now receives drawing data, and corresponding waveforms are applied immediately to the second set of pixels while the image update of the first set of pixels continues. During the next frame, the frame counter for the first set of pixels becomes nineteen and the frame counter for the second set of pixels becomes twenty-nine. The image update is stopped on the first set of pixels after the frame counter for the first set of pixels reaches zero, while the frame counter for the second set of pixels becomes ten. The image update of the second set of pixels continues until the frame counter for the second set of pixels reaches zero. In a similar manner, the application and counting of driving or drawing-mode waveforms may be applied to other pixels.

Alternatively, other display modes may be entered such as monochrome update mode, grayscale update mode, grayscale clear mode, initialize mode or sleep mode and functions of the display continued, as seen at block 112. For example, the display may require refreshing with stored image or drawing information and previous image data is re-sent to the display. As the image is being written to the electrophoretic display, the image may be viewed. Further refreshing or writing of new images may occur as desired within, for example, a portion of a second, minutes, hours, days, weeks or even months after writing previous images.

When no refreshing or updating of the image is required, circuitry may be powered down or turned off, and the electrophoretic display may be powered off or otherwise placed in a power-down mode. When powered off or powered down, the electrophoretic display retains the image previously written to the display or another predetermined display image such as all white, all black, or other predetermined screen image.

In another embodiment, a controller receives a command code to convert incoming pixel data with coordinates into pixel information including a display address, a pixel index and a pixel color representing the gray or color level to be achieved. This information is then written into a first-in, first-out memory (FIFO). Pixel information from the FIFO memory is transferred to controller memory such as static random access memory. The pixel information together with a pixel counter is written in a list with pixels to be updated using the drawing-update mode. A display frame update is started. At the end of the display frame update, if the FIFO memory is not empty or the pixel update list is not empty, another display frame update is started and the process continues until every pixel has an associated pixel counter equal to zero. When the pixel counter pixel for a pixel is zero, the pixel data is stored in memory and the drawing-mode update for that pixel is completed. New image data may be placed in memory in parallel with the display frame update process. The pixel update time elapsed between when a pixel is received and when a pixel appears on the display is short to minimize image latency affects.

While in the drawing-update mode, the controller continues to update the display in parallel with receiving pixel data. Two memory frames representing the previous and current images are not changed during the drawing-update mode. The previous pixel state is given by the background when the drawing process has been started. When a pixel achieves the desired optical state, the pixel state is written into the previous memory frame. In this manner, when the controller detects no transitions for the pixel, the pixel will get zero voltage. A counter for each pixel is used to store the number of how many frames the pixel has been updated with. The pixel counter is stored and maintained in a memory buffer with a list of pixels that need to be updated. After each frame is applied, the controller decrements the pixel counters. When a pixel counter becomes zero, the associated pixel is removed from the list and the pixel data is written into the previous memory frame. A set of counter values depending on the temperature may be defined and stored in nonvolatile memory to provide temperature-compensated gray scale while in the drawing-update mode.

In this embodiment, the drawing-mode waveform may be as short as one frame time. The display may be refreshed when new image updates are applied to reduce or eliminate image ghosting that may occur with the use of relatively short driving waveforms in the drawing mode.

In another embodiment, a first set of pixels is addressed based on image or drawing information with a selected driving or drawing-mode waveform. A second set of pixels in the display is addressed based on the same or different image or drawing information along with the same or a different driving or drawing-mode waveform. The driving or drawing-mode waveform of the second set of pixels may be started prior to the completion of updating the first set of pixels.

While the embodiments of the invention disclosed herein are presently considered to be preferred, various changes and modifications can be made without departing from the spirit and scope of the invention. The polarity of preconditioning and reset voltages, the data-frame times, the length of the drawing-mode waveforms and the order of the portions included thereof, the number of gray levels, the size and number of pixel elements, the color of electrophoretic ink, and the thickness of the various layers have been chosen to be illustrative and instructive. The activation voltages, timing, color of the electrophoretic ink, included layers, pixel size, array size, driving waveforms, drawing-mode waveforms, and other signals and quantities may vary appreciably from that which is shown without departing from the spirit and scope of the claimed invention. The invention is applicable to other bi-stable displays, such as an electrochromic display or a liquid crystal display. The scope of the invention is indicated in the appended claims, and all changes that come within the meaning and range of equivalents are intended to be embraced therein.

The invention claimed is:

1. An improved addressing method for updating electrophoretic displays with lower latency for use with interactive applications, the method comprising:
   a) receiving drawing information for at least one electrophoretic pixel in the electrophoretic display;
   b) determining at least one drawing-mode waveform of the at least one electrophoretic pixel in the electrophoretic display based on the received drawing information for the at least one electrophoretic pixel;
   c) applying the at least one drawing-mode waveform a predetermined number of times to complete an image update onto the at least one electrophoretic pixel in the electrophoretic display, wherein the predetermined application of the at least one drawing mode waveform includes transitioning the at least one electrophoretic pixel from a current optical state and proceeding through at least one grey scale transition before arriving to a final optical state; and
prior to the completion of the image update for the at least one electrophoretic pixel at said step (c) and subsequent to the start of the image update for the at least one electrophoretic pixel at said step (c):
   d) receiving drawing information for at least one additional electrophoretic pixel in the electrophoretic display,
   e) determining at least one drawing-mode waveform for the at least one additional electrophoretic pixel in the electrophoretic display based on the received drawing information for the at least one additional electrophoretic pixel in the electrophoretic display;
   f) applying the at least one drawing-mode waveform a predetermined number of times to complete an image update onto the at least one additional electrophoretic pixel in the electrophoretic display, wherein the predetermined application of the at least one drawing mode waveform includes transitioning the at least one additional electrophoretic pixel from a current optical state and proceeding through at least one grey scale transition before arriving to a final optical state.

2. The method of claim 1, wherein the received drawing information includes a keyboard input.

3. The method of claim 2, wherein the keyboard input is received from one of a keyboard or a keypad.

4. The method of claim 1, wherein the received drawing information includes a drawing input.

5. The method of claim 4, wherein the drawing input is received from a touch screen.

6. The method of claim 1, wherein the received drawing information includes a pointer input.

7. The method of claim 6, wherein the pointer input is received from one of a mouse or a cursor generator.

8. The method of claim 1, wherein determining the at least one drawing-mode waveform includes:
   selecting the drawing-mode waveform from a set of stored driving waveforms based on the drawing information and a current optical state of at least one electrophoretic pixel in the portion of the electrophoretic display.

9. The method of claim 1, wherein the drawing-mode waveform is selected from a lookup table.

10. The method of claim 1, wherein addressing the portion of the electrophoretic display includes:
    applying the determined drawing-mode waveform a predetermined number of times to write an image onto at least one electrophoretic pixel in the electrophoretic display.

11. The method of claim 1, wherein addressing the portion of the electrophoretic display includes:
    writing pixel data onto at least one electrophoretic pixel in the portion of the electrophoretic display.

12. The method of claim 1, further comprising:
    storing pixel information based on the received drawing information; and
    addressing the portion of the electrophoretic display based on the stored pixel information.

13. The method of claim 12, wherein the stored pixel information includes at least one of the group consisting of a pixel index, a pixel color level, a pixel coordinate, and a pixel counter.

14. The method of claim 12, further comprising:
    updating the stored pixel information when the portion of the electrophoretic display is addressed.

15. The method of claim 1, further comprising:
    addressing a first set of pixels in the electrophoretic display based on the received drawing information and the drawing-mode waveform; and
    addressing a second set of pixels in the electrophoretic display based on the received drawing information and a second drawing-mode waveform;
        wherein the second drawing-mode waveform is applied to the second set of pixels prior to completion of an image update for the first set of pixels.

16. A system for activating a portion of an electrophoretic display, the system comprising:
    an electrophoretic pixel array disposed on a backplane;
    means for receiving drawing information for at least one electrophoretic pixel in the electrophoretic display;
    means for determining at least one drawing-mode waveform for the at least one electrophoretic pixel in the electrophoretic display based on the received drawing information for the at least one electrophoretic pixel
    means for applying the at least one drawing-mode waveform a predetermined number of times to complete an image update onto the at least one electrophoretic pixel in the electrophoretic display;
    wherein the predetermined application of the at least one drawing mode waveform includes transitioning the at least one electrophoretic pixel from a current optical state and proceeding through at least one grey scale transition before arriving to a final optical state; and
prior to the completion of the image update for the at least one electrophoretic pixel and subsequent to the start of the image update for the at least one electrophoretic pixel:
    means for receiving drawing information for at least one additional electrophoretic pixel in the electrophoretic display,
    means for determining at least one drawing-mode waveform for the at least one additional electrophoretic pixel in the electrophoretic display based on the received drawing information for the at least one additional electrophoretic pixel in the electrophoretic display;
    means for applying the at least one drawing-mode waveform a predetermined number of times to complete an image update onto the at least one additional electrophoretic pixel in the electrophoretic display, wherein the predetermined application of the at least one drawing mode waveform includes transitioning the at least one additional electrophoretic pixel from a current optical state and proceeding through at least one grey scale transition before arriving to a final optical state.

17. The system of claim 16, further comprising:
means for storing pixel information based on the received drawing information; and
means for addressing the portion of the electrophoretic display based on the stored pixel information.

18. The system of claim 17, further comprising:
means for updating the stored pixel information when the portion of the electrophoretic display is addressed.

19. An electrophoretic display, comprising:
an electrophoretic pixel array disposed on a backplane;
a row driver electrically connected to a set of rows of the electrophoretic pixel array;
a column driver electrically connected to a set of columns of the electrophoretic pixel array;
and a controller electrically connected to the row driver and the column driver;
wherein the controller receives drawing information for at least one electrophoretic pixel in the electrophoretic display;
wherein the controller determines at least one drawing-mode waveform for the at least one electrophoretic pixel of the electrophoretic display based on the received drawing information for the at least one electrophoretic pixel;
and wherein the controller applies the at least one drawing-mode waveform a predetermined number of times to complete an image update onto the at least one electrophoretic pixel of the electrophoretic display;
wherein the predetermined application of the at least one drawing mode waveform includes transitioning the at least one electrophoretic pixel from a current optical state and proceeding through at least one grey scale transition before arriving to a final optical state; and
prior to the completion of the image update for the at least one electrophoretic pixel and subsequent to the start of the image update for the at least one electrophoretic pixel:
wherein the controller receives drawing information for at least one additional electrophoretic pixel in the electrophoretic display;
wherein the controller determines at least one drawing-mode waveform for the at least one additional electrophoretic pixel in the electrophoretic display based on the received drawing information for the at least one additional electrophoretic pixel;
and wherein the controller applies the at least one drawing-mode waveform a predetermined number of times to complete an image update onto the at least one additional electrophoretic pixel in the electrophoretic display;
wherein the predetermined application of the at least one drawing mode waveform includes transitioning the at least one additional electrophoretic pixel from a current optical state and proceeding through at least one grey scale transition before arriving to a final optical state.

* * * * *